(12) United States Patent
Zhu et al.

(10) Patent No.: US 11,525,673 B2
(45) Date of Patent: Dec. 13, 2022

(54) FIVE-DEGREE-OF-FREEDOM HETERODYNE GRATING INTERFEROMETRY SYSTEM

(71) Applicant: TSINGHUA UNIVERSITY, Beijing (CN)

(72) Inventors: Yu Zhu, Beijing (CN); Ming Zhang, Beijing (CN); Leijie Wang, Beijing (CN); Weinan Ye, Beijing (CN); Fuzhong Yang, Beijing (CN); Yizhou Xia, Beijing (CN); Xin Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/275,651

(22) PCT Filed: Nov. 16, 2018

(86) PCT No.: PCT/CN2018/115782
§ 371 (c)(1),
(2) Date: Mar. 11, 2021

(87) PCT Pub. No.: WO2020/052056
PCT Pub. Date: Mar. 19, 2020

(65) Prior Publication Data
US 2022/0042792 A1    Feb. 10, 2022

(30) Foreign Application Priority Data
Sep. 13, 2018 (CN) .......................... 201811066763.0

(51) Int. Cl.
G01B 11/26 (2006.01)

(52) U.S. Cl.
CPC .................................. G01B 11/26 (2013.01)

(58) Field of Classification Search
CPC ....... G01B 11/26; G01B 11/27; G01B 11/272; G01B 2290/70; G01B 2290/60;
(Continued)

(56) References Cited

U.S. PATENT DOCUMENTS

| 6,657,181 B1 | 12/2003 | Ishizuka et al. |
| 2004/0212748 A1* | 10/2004 | Suzuki ................. H04N 9/3105 349/8 |

(Continued)

FOREIGN PATENT DOCUMENTS

| CN | 102906545 A | 1/2013 |
| CN | 102944176 A | 2/2013 |

(Continued)

OTHER PUBLICATIONS

International search report of PCT/CN2018/115782.
First office action of CN201811066763.0.

*Primary Examiner* — Sunghee Y Gray

(57) ABSTRACT

A five-degree-of-freedom heterodyne grating interferometry system, comprising a single frequency laser device (1) and an acousto-optic modulator (2); the single frequency laser device (1) emits a single frequency laser, and the single frequency laser is coupled by optical fiber and, after being split, enters the acousto-optic modulator (2) to obtain two linearly polarized lights of different frequencies, one being a reference light, and one being a measurement light; an interferometer lens group (3) and a measurement grating (4), used for forming the reference light and the measurement light into a measurement interference signal and a compensation interference signal; and multiple optical fiber bundles (5), respectively receiving the measurement interference signal and the compensation interference signal, each optical fiber bundle (5) having multiple multimode optical fibers respectively receiving signals at different positions on the same plane. The present measurement system has the advan- (Continued)

tages of high measurement precision, a large measurement range, not being sensitive to temperature drift, and small overall size, and can be used as a photoetching machine ultra-precision workpiece table position measurement system.

12 Claims, 2 Drawing Sheets

(58) Field of Classification Search
CPC .............. G01B 11/02; G01B 9/02003; G01B 9/02019; G01B 9/02027; G01B 9/0207
USPC .................................................... 356/488
See application file for complete search history.

(56) References Cited

U.S. PATENT DOCUMENTS

| | | | | |
|---|---|---|---|---|
| 2011/0255096 | A1* | 10/2011 | Deck | G01D 5/38 |
| | | | | 356/486 |
| 2016/0138903 | A1* | 5/2016 | Zhang | G01B 11/14 |
| | | | | 356/488 |
| 2021/0262834 | A1* | 8/2021 | Zhang | G01D 5/3537 |

FOREIGN PATENT DOCUMENTS

| | | |
|---|---|---|
| CN | 103322927 A | 9/2013 |
| CN | 106152974 A | 11/2016 |
| CN | 106813578 A | 6/2017 |
| CN | 108106536 A | 6/2018 |
| CN | 108627099 A | 10/2018 |

* cited by examiner

FIVE-DEGREE-OF-FREEDOM HETERODYNE GRATING INTERFEROMETRY SYSTEM

CROSS-REFERENCE TO RELATED APPLICATIONS

The present application claims priority from Chinese patent application No. 201811066763.0, filed with the Chinese National Intellectual Property Administration on Sep. 13, 2018 and entitled "Five-Degree-of-Freedom Heterodyne Grating Interferometry System", the entire content of which is incorporated herein by reference.

FIELD OF THE INVENTION

The present disclosure relates to a grating measurement system; in particular, the present disclosure relates to a five-degree-of-freedom heterodyne grating interferometry system.

BACKGROUND OF THE INVENTION

Due to technological development and industrial demand, in the design and manufacture of specific large precision processing equipment, the accuracy of measurement system has become an important technical indicator. Interferometry systems are also being widely used in fields such as production and scientific research due to their high precision. Common interference systems include laser interferometry systems and grating interferometry systems, as well as heterodyne interferometry systems and homodyne interferometry systems.

At present, existing laser interferometry systems generally can only realize displacement measurement of a single degree of freedom, and multi-degree-of-freedom measurement systems rarely exist. As far as the existing commercial laser interferometers are concerned, the measurement accuracy is usually of the order of nanometer. However, in the actual measurement process, the accuracy of the measurement results decreases due to geometric installation errors, thermal drift errors, and periodic nonlinear errors. In the actual movement process, small rotational angles caused by vibration and other environmental factors will bring additional displacements in the x-direction and z-direction displacement measurement. With the continuous improvement of movement indicators such as measurement accuracy, movement distance and actual speed, as well as the increasing demand for multi-degree-of-freedom measurement, it is necessary to design a measurement system that can realize multi-degree-of-freedom measurement and exhibit performance indicators such as measurement range and accuracy that can meet actual needs.

In view of the above problems, in order to meet the measurement requirements of multiple degrees of freedom, the existing multi-degree-of-freedom measurement systems on the market currently use a method of distributed combination of multiple single-degree-of-freedom laser measurement systems. A multi-axis laser interferometer is installed in one direction, then a pyramid prism is used to change the direction of measurement light, a reflecting mirror is subsequently installed on the side in the light propagation direction, and finally a displacement difference is used to achieve six-degree-of-freedom measurement. This method is used in U.S. Pat. No. 6,020,964B2 (published on Feb. 1, 2000) owned by ASML Corporation in the Netherlands, U.S. Pat. No. 6,980,279B2 (published on Dec. 27, 2005) owned by Nikon Corporation in Japan, and U.S. Pat. No. 7,355,719B2 (published on Apr. 8, 2008) owned by Agilent Corporation in the U.S.A. This kind of interferometry system combined in a distributed manner is not compact in structure, is complicated in optical debugging, and requires multiple measurement signals, which brings difficulties to signal processing and makes it difficult to meet current measurement requirements. There is also a multi-degree-of-freedom measurement method that uses a combination of multiple detectors to achieve simultaneous measurement of multiple degrees of freedom by measuring the position change of light spot. The above methods have complicated system structure, the actual measurement relies on the specific optical path structure, and the measurement accuracy depends on the performance of the detector and environmental factors. Currently, the measurement accuracy of rotational angle is generally of the order of arcsecond, and the measurement accuracy of displacement is generally of the order of micrometer, which rarely reaches the order of nanometer.

SUMMARY OF THE INVENTION

In view of the deficiencies of the current technical solutions and in order to meet the demand for ultra-precision measurement, a five-degree-of-freedom heterodyne grating interferometry system is invented. The interferometry system has the advantages of realizing multi-degree-of-freedom measurement, simple and compact structure, high accuracy, wide measurement range, being less susceptible to environmental factors, being capable of compensating for thermal drift noise and, optical fiber transmission errors, etc. The measurement system can measure two linear displacements and three rotational angles at the same time, with the accuracy being of the order of nanometer and microradian respectively. As compared with the above-mentioned multi-degree-of-freedom measurement systems, the present measurement system has obvious advantages, and can be applied to occasions such as precision machine tools, three-coordinate measuring machines, semiconductor detection equipment that require large-stroke linear displacement and precise measurement of a certain rotational angle. The present measurement system can be especially used in the measurement of an ultra-precision workpiece table of a lithography machine.

The following technical solution is adopted by the present disclosure: a five-degree-of-freedom heterodyne grating interferometry system includes: a single-frequency laser device and an acousto-optic modulator, wherein the single-frequency laser device emits a single-frequency laser, which is then incident on the acousto-optic modulator after optical fiber coupling and beam splitting to obtain two beams of linearly polarized light of different frequencies, one beam of which serves as a reference light, and the other beam of which serves as a measurement light; an interferometer lens group and a measurement grating, which are used to form the reference light and the measurement light into a measurement interference signal and a compensation interference signal; and a plurality of optical fiber bundles which receive the measurement interference signal and the compensation interference signal respectively, wherein each of the optical fiber bundles has a plurality of multimode optical fibers for receiving signals at different positions in the same plane respectively; the interferometer lens group includes beam splitting prisms, right-angle prisms, a quarter-wave plate, a refractive element, a reflecting mirror, and polarization beam splitting prisms.

Further, the components of the interferometer lens group are distributed symmetrical up and down, wherein the beam splitting prisms are located in upper and lower layers of the lens group and are distributed symmetrically, the polarization beam splitting prisms are located in a middle layer of the lens group, and the refractive element is located at a top end of the lens group; the right-angle prisms are arranged at positions of 90° deflection of optical path, and are bonded to the beam splitting prisms and the polarization beam splitting prisms; the measurement light and the reference light pass through the same path in the interferometer lens group.

Further, the reference light is divided into three beams of reference light after being split by two beam splitting prisms and reflected by the right-angle prism, and the three beams of reference light are used as three interference signals after being reflected by the middle three polarization beam splitting prisms; the measurement light is divided into three beams of measurement light after being split by two beam splitting prisms and reflected by the right-angle prism; two of the three beams of measurement light are reflected by the polarization beam splitting prism, pass through the quarter-wave plate and the refractive element in turn, and then are incident on the measurement grating from left and right sides of the refractive element at the Littrow angle; the diffracted beams return along the original optical path, then are transmitted through the quarter-wave plate and the middle two polarization beam splitting prisms in turn, and are reflected by the two right-angle prisms to respectively interfere with the two beams of reference light serving as the interference signals and form two measurement interference signals; the third beam of measurement light is reflected by the polarization beam splitting prism, passes through the quarter-wave plate, and is then reflected by the reflecting mirror; then it passes through the quarter-wave plate again, is transmitted through the polarization beam splitting prism, is reflected by the two right-angle prisms, and interferes with the third beam of reference light serving as the interference signal to form one compensation interference signal.

Further, the measurement grating makes a two-degree-of-freedom linear movement and a three-degree-of-freedom rotational movement relative to the interferometer lens group.

Further, the interferometer lenses are distributed symmetrical up and down, and the measurement light and the reference light pass through the same path in the interferometer lenses; when solving the two-degree-of-freedom linear displacement, the temperature drift error of the horizontal displacement is automatically eliminated, and the temperature drift error of the vertical displacement is eliminated by the compensation interference signal.

Further, the displacements of the two linear movements are measured based on the Doppler frequency shift principle, with the accuracy being of the order of nanometer; and the three rotational angles are measured based on the principle of differential wavefront, with the measurement range of the rotational angle being 1 mrad and the accuracy reaching the order of microradian.

Further, the number of the compensation interference signal is one, the number of the measurement interference signal is two, and the two measurement interference signals and the one compensation interference signal are respectively received by the optical fiber bundles; each optical fiber bundle has four optical fibers that are located at different positions in the same plane and are used to receive interference signals of four quadrants; each optical fiber bundle outputs four optical signals, and there is a total of twelve optical signals.

Further, the interferometry system further includes a photoelectric conversion unit and an electronic signal processing component, wherein the photoelectric conversion unit is used to receive the optical signals transmitted by the optical fiber bundles and convert them into electrical signals for input into the electronic signal processing component, and the electronic signal processing component receives the electrical signals to solve the linear displacement and/or rotational movement of the measurement grating.

Furthermore, due to the existence of the compensation interference signal, optical fiber transmission errors of the measurement system can be compensated.

Further, the measurement system is suitable for laser interferometers, grating interferometers, heterodyne interferometers, and homodyne interferometers.

As compared with the prior art, the precision five-degree-of-freedom heterodyne grating interferometry system provided by the present disclosure has the following advantages: the measurement system can simultaneously realize the five-degree-of-freedom measurement of two translational displacements and three rotational angles, with the accuracy being of the order of nanometer and microradian respectively; the measurement system has the advantages of realizing multi-degree-of-freedom measurement, simple and compact structure, high accuracy, wide measurement range, being, less susceptible to environmental factors, being capable of compensating for thermal drift noise and optical fiber transmission errors, etc. As compared with existing multi-degree-of-freedom interferometry systems, the present interferometry system can avoid the influence of geometric installation errors such as Abbe error and cosine error on the accuracy, and can better meet the existing measurement requirements. At the same time, the measurement system can compensate for errors caused by temperature drift through its own symmetrical optical structure, and can compensate for optical fiber transmission errors due to the existence of compensation interference signals. The five-degree-of-freedom heterodyne grating interferometer displacement measurement system can also be widely applied to occasions that require precision measurement of multi-degree-of-freedom displacement, such as precision machine tools, three-coordinate measuring machines and, semiconductor detection equipment, and is especially suitable for measurement of an ultra-precision workpiece table of a lithography machine.

REFERENCE SIGNS

1: single-frequency laser device; 2: acousto-optic modulator; 3: interferometer lens group; 4: one-dimensional plane reflection grating; 5: optical fiber bundle; 6: photodetector; 7: electronic signal processing unit; 31: beam splitting prism; 32: right-angle prism; 33: quarter-wave plate; 34: refractive element; 35: reflecting mirror; 36: polarization beam splitting prism.

DETAILED DESCRIPTION OF THE EMBODIMENT(S) OF THE INVENTION

The principle, preferred structure and specific implementations of the present disclosure will be further described in detail below in conjunction with the accompanying drawings. Although preferred embodiments of the present disclosure have been described, it should be understood that the present disclosure should not be limited to these preferred embodiments; instead, those skilled in the art can make various changes and modifications to the present disclosure within the spirit and scope required by the claims.

Figure 1:
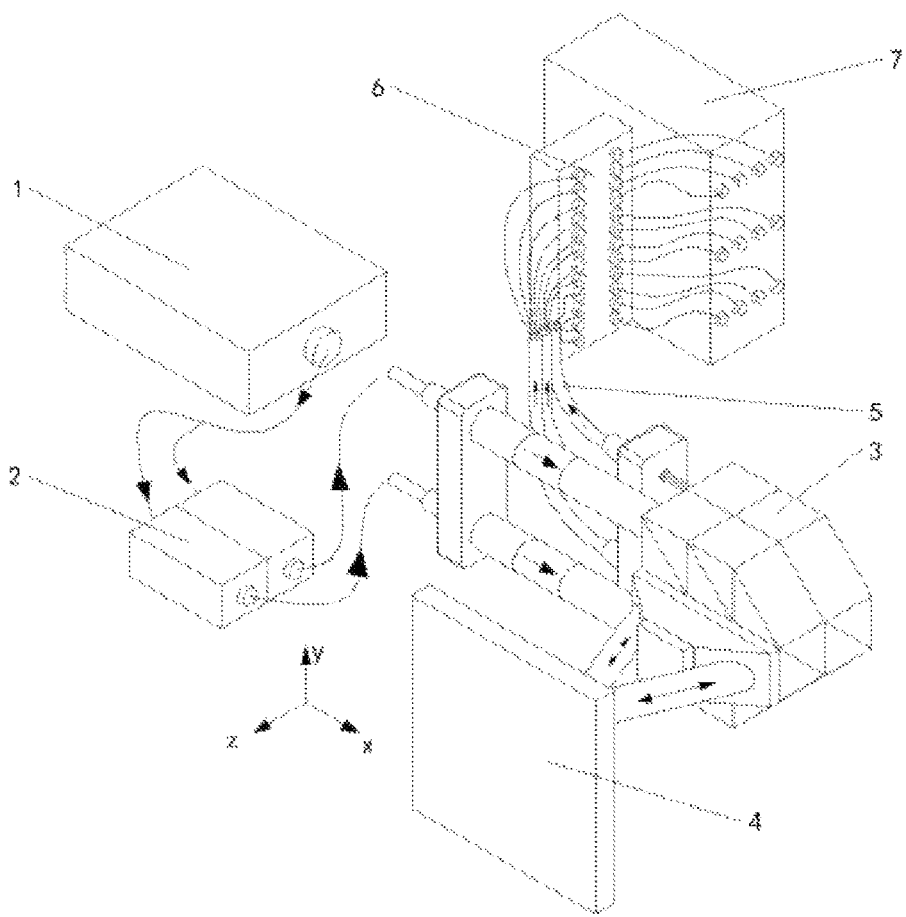
FIG. 1 is a schematic view of a five-degree-of-freedom interferometry system of the present disclosure.

Reference is made to FIG. 1, which is a schematic view of a five-degree-of-freedom heterodyne grating interferometry system of the present disclosure. As shown in FIG. 1, the five-degree-of-freedom heterodyne grating, interferometry system includes a single-frequency laser device 1, an acousto-optic modulator 2, an interferometer lens group 3, a measurement grating 4, optical fiber bundles 5, a photodetector 6, and an electronic signal processing unit 7.

Figure 2:
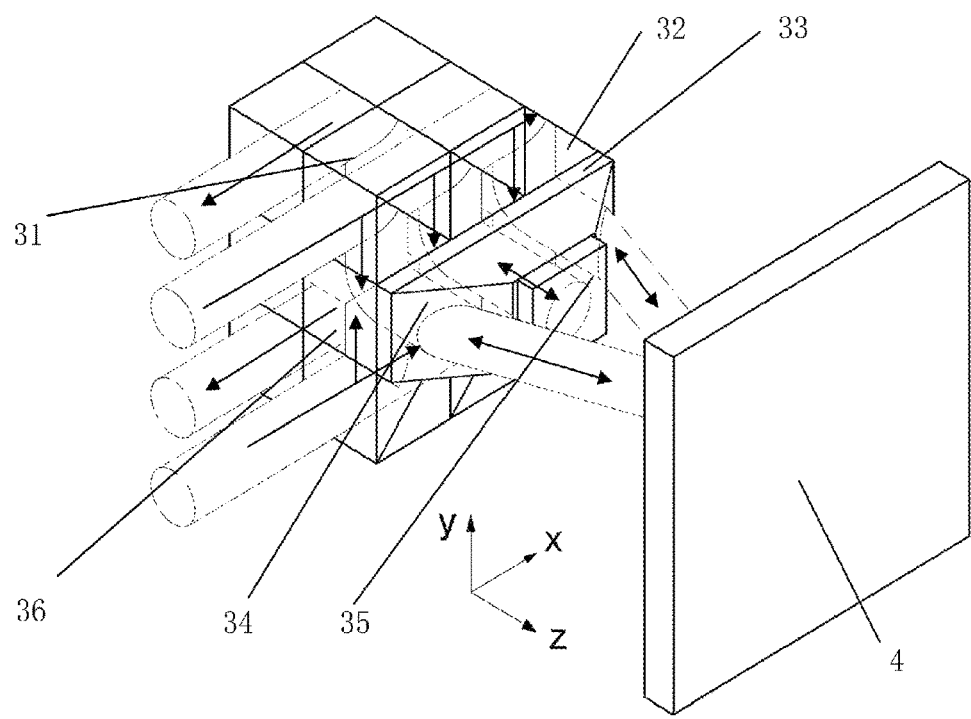
FIGS. 2 and 3 are schematic views of the structure of an interferometer lens group of the present disclosure.
Figure 3:
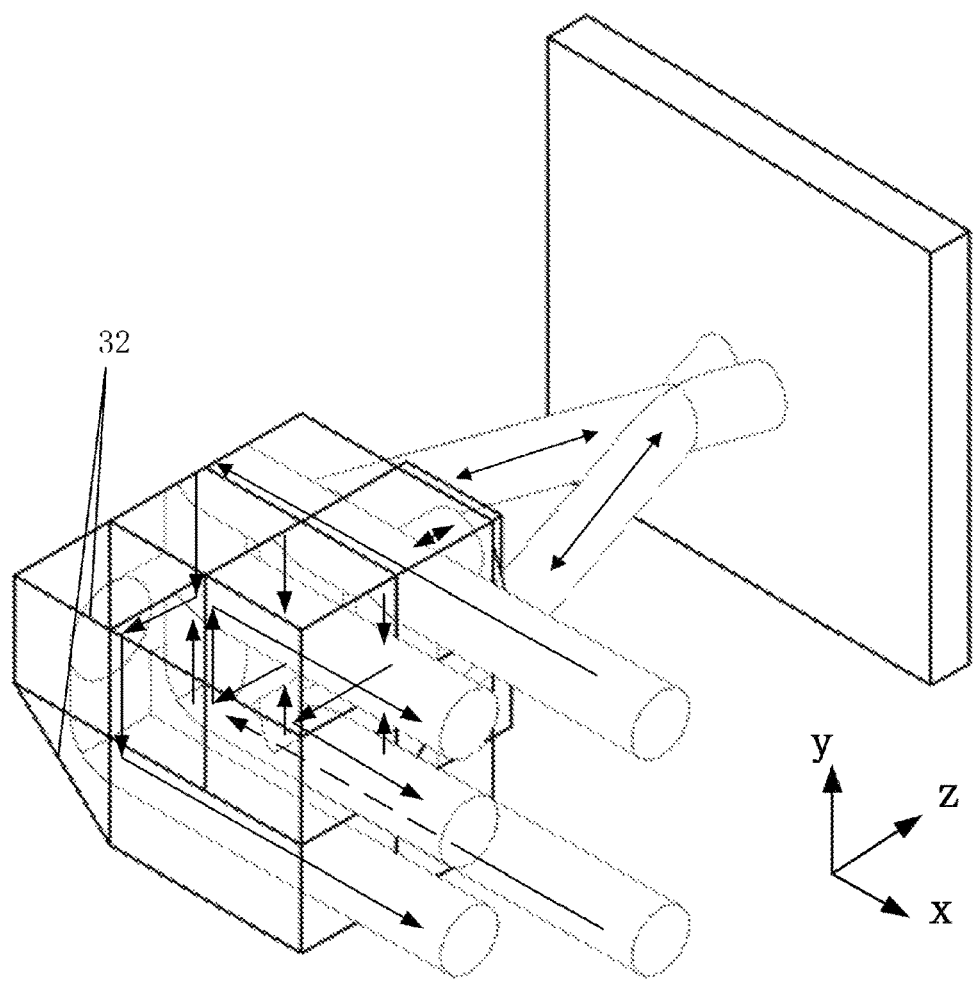

Reference is made to FIGS. 2 and 3, which are schematic views of the structure of the interferometer lens group of the present disclosure. As shown in FIG. 2, the interferometer lens group 3 includes beam splitting prisms 31, polarization beam splitting prisms 36, a refractive element 34, a quarter-wave plate 33, a reflecting mirror 35, and right-angle prisms 32. The beam splitting prisms 31 are preferably located in upper and lower layers of the lens group, and are preferably distributed symmetrically. The polarization beam splitting prisms 36 are located in a middle layer or middle position of the lens group, and the refractive element 34 is preferably located at a top end of the lens group. The right-angle prisms 32 are arranged at positions of 90° deflection of optical path, and are preferably adhered to the beam splitting prisms 31 and the polarization beam splitting prisms 36. All these elements are preferably fixed by bonding.

Figure 4:
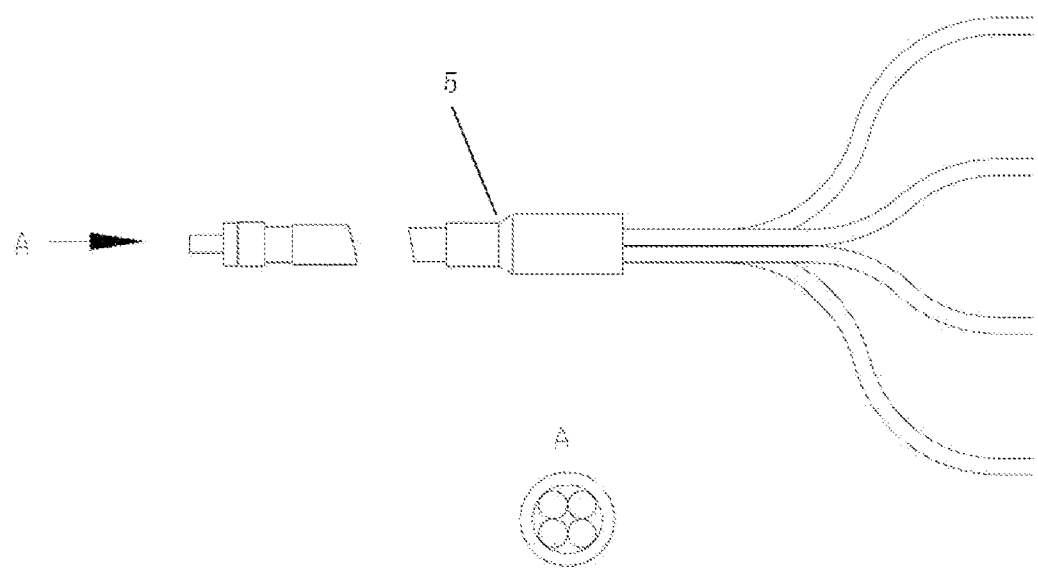
FIG. 4 is a schematic cross-sectional view of an optical fiber bundle used in the present disclosure.

Reference is made to FIG. 4, which is a schematic cross-sectional view of the optical fiber bundle of the present disclosure. As shown in FIG. 4, each optical fiber, bundle 5 contains four multimode optical fibers therein. The four multimode optical fibers are located at different positions in the same plane; instead of quadrant photodetectors, the four multimode optical fibers are used to receive interference signals of four quadrants.

The principle of the measurement system will be explained in detail in conjunction with FIGS. 1 and 2. The single-frequency laser device 1 emits a single frequency laser, which is then incident on the acousto-optic modulator 2 after optical fiber coupling and beam splitting to obtain two beams of polarized light of different frequencies, one beam of which serves as a reference light, and the other beam of which serves as a measurement light. The reference light is divided into three beams of reference light after being split by two beam splitting prisms 31 and reflected by the right-angle prism 32, and the three beams of reference light are used as three interference signals after being reflected by the middle three polarization beam splitting prisms 36 the measurement light is divided into three beams of measurement light after being split by two beam splitting prisms 31 and reflected by the right-angle prism 32; two of the three beams of measurement light are reflected by the polarization beam splitting prism 36, pass through the quarter-wave plate 33 and the refractive element 34 in turn, and then are incident on the measurement grating 4 from left and right sides of the refractive element 34 at the Littrow angle; the diffracted beams return along the original optical path, then are transmitted through the quarter-wave plate 33 and the middle two polarization beam splitting prisms 36 in turn, and are reflected by the two right-angle prisms 32 to respectively interfere with the two beams of reference light serving as the interference signals and form two measurement interference signals; the third beam of measurement, light is reflected by the polarization beam splitting prism 36, passes through the quarter-wave plate 33, and is then reflected by the reflecting mirror 35; then it passes through the quarter-wave plate 33 again, is transmitted through the polarization beam splitting prism 36, is reflected by the two right-angle prisms 32, and interferes with the third beam of reference light serving as the interference signal to form one compensation interference signal.

The two measurement interference signals and one compensation interference signal are received by three optical fiber bundles 5 respectively. Each of the optical fiber bundles internally contains four multimode optical fibers for collecting optical signals of the four quadrants of the same interference signal. After the receipt by the optical fiber bundles 5, the formed, twelve signals are transmitted to the photodetector 6 and converted into electrical signals, which are then transmitted to the electronic signal processing unit 7 for processing. Using the obtained phase information, the rotational angle information of the grating can be solved based on the principle of differential wavefront. The obtained rotational angle is used to compensate for the phase caused by the additional displacement, and then the two-degree-of-freedom linear movement is then solved. When the measurement grating 4 performs translational movements in the x-direction and z-direction and three rotational movements relative to the interferometer lens group 3, the electronic signal processing unit 7 will output linear displacements of two degrees of freedom and rotational angles of three degrees of freedom.

The expression of the five-degree-of-freedom movement solution is:

$$\theta_x = \frac{(\phi_1 + \phi_2 + \phi_5 + \phi_6) - (\phi_3 + \phi_4 + \phi_7 + \phi_8)}{\Gamma_x}$$

$$\theta_y = \frac{(\phi_1 + \phi_3 + \phi_5 + \phi_7) - (\phi_2 + \phi_4 + \phi_6 + \phi_8)}{\Gamma_y}$$

$$\theta_z = \frac{(\phi_1 + \phi_2 + \phi_7 + \phi_8) - (\phi_3 + \phi_4 + \phi_5 + \phi_6)}{\Gamma_z}$$

$$x = \left[\frac{(\phi_1 + \phi_2 + \phi_3 + \phi_4) - (\phi_5 + \phi_6 + \phi_7 + \phi_8)}{4} + \phi_{x\theta}\right] \times \frac{p}{4\pi}$$

$$z = \left[\frac{(\phi_1 + \phi_2 + \phi_3 + \phi_4) - (\phi_5 + \phi_6 + \phi_7 + \phi_8)}{4} + \phi_{z\theta}\right] \times \frac{\lambda}{8\pi\cos\theta}$$

where $\theta_{x,y,z}$ are the rotational angles of the grating relative to the interferometer lens group, x, z are the displacements of the grating relative to the interferometer lens group, $\Phi_{1,2,3,4,5,6,7,8}$ are the reading values of the two measurement signals on the electronic signal processing card, $\Gamma_{x,y,z}$ are calibration constants, $\Phi_{x\theta,z\theta}$ are additional displacement compensation phases, p is the grating pitch of the grating, $\lambda$ is the laser wavelength, and $\theta$ is the Littrow angle.

The measurement system and the structural solution given in the above embodiment can simultaneously measure three rotational angles and two linear displacements, and the system has high measurement accuracy. The measurement accuracy of the rotational angle is of the order of microradian, and the measurement accuracy of the linear displacement is of the order of nanometer. The system is less affected by the environment, and the optical fiber bundles are used to simplify the optical path, while also improving the anti-interference ability and system integration of the measurement system. At the same time, the optical structure of the system adopts a structure symmetrical up and down to compensate for errors caused by temperature drift. The measurement system is applied to displacement measurement of an ultra-precision workpiece table of a lithography machine. As compared with the laser interferometer measurement system, the mass and volume of the workpiece table can be effectively reduced on the basis of meeting the measurement requirements, and the dynamic performance of the workpiece table can be greatly improved so that the overall performance of the workpiece table is comprehensively improved. The five-degree-of-freedom heterodyne grating interferometry system can also be applied to other occasions of multi-degree-of-freedom precision measurement, such as precision machine tools, three-coordinate measuring machines, and semiconductor detection equipment.

The present disclosure is not limited to the above embodiment, and other structural designs obtained by using the same or similar structure as the above embodiment of the present disclosure are all within the scope of protection of the present disclosure.

What is claimed is:

1. A five-degree-of-freedom heterodyne grating interferometry system, comprising: a laser device (1) and an acousto-optic modulator (2), wherein the laser device (1) emits a laser, which is then incident on the acousto-optic modulator (2) after optical fiber coupling and beam splitting to obtain two beams of linearly polarized light of different frequencies, one beam of which serves as a reference light, and the other beam of which serves as a measurement light; an interferometer lens group (3) and a measurement grating (4), which are used to form the reference light and the measurement light into a measurement interference signal and a compensation interference signal; and a plurality of optical fiber bundles (5), which receive the measurement interference signal and the compensation interference signal respectively;

wherein the interferometer lens group (3) comprises beam splitting prisms (31), right-angle prisms (32), a quarter-wave plate (33), a refractive element (34), a reflecting mirror (35), and polarization beam splitting prisms (36); and wherein components of the interferometer lens group (3) are distributed symmetrical up and down, the beam splitting prisms (31) are located in upper and lower layers of the interferometer lens group, the polarization beam splitting prisms (36) are located in a middle layer of the interferometer lens group, and the refractive element (34) is located at a top end of the interferometer lens group; the right-angle prisms (32) are arranged at positions of 90° deflection of optical path, and are adhered to the beam splitting prisms (31) and the polarization beam splitting prisms (36) respectively; the measurement light and the reference light pass through same path in the interferometer lens group (3).

2. The five-degree-of-freedom heterodyne grating interferometry system according to claim 1, wherein each of the optical fiber bundles (5) contains a plurality of multimode optical fibers for receiving signals at different positions in same plane respectively.

3. The five-degree-of-freedom heterodyne grating interferometry system according to claim 2, wherein the number of the compensation interference signal is one, the number of the measurement interference signal is two, and the two measurement interference signals and the one compensation interference signal are respectively received by the optical fiber bundles (5).

4. The five-degree-of-freedom heterodyne grating interferometry system according to claim 1, wherein the reference light is divided into three beams of reference light after being split by two beam splitting prisms (31) and reflected by the right-angle prism (32), and the three beams of reference light are used as three interference signals after being reflected by middle three of the polarization beam splitting prisms (36);

the measurement light is divided into three beams of the measurement light after being split by two beam splitting prisms (31) and reflected by the right-angle prisms (32);

two of the three beams of the measurement light are reflected by the polarization beam splitting prisms (36), pass through the quarter-wave plate (33) and the refractive element (34) in turn, and then are incident on the measurement grating (4) from left and right sides of the refractive element (34); diffracted beams return along an original optical path, then are transmitted through the quarter-wave plate (33) and middle two of the polarization beam splitting prisms (36) in turn, and are reflected by two of the right-angle prisms (32) to respectively interfere with two beams of the reference light serving as two of the three interference signals and form two measurement interference signals;

a third beam of the measurement light is reflected by the polarization beam splitting prism (36), passes through the quarter-wave plate (33), and is then reflected by the reflecting mirror (35); then it passes through the quarter-wave plate (33) again, is transmitted through the polarization beam splitting prism (36), is reflected by two of the right-angle prisms (32), and interferes with a third beam of the reference light serving as one of the three interference signals to form the compensation interference signal.

5. The five-degree-of-freedom heterodyne grating interferometry system according to claim 1, wherein the measurement grating (4) makes a two-degree-of-freedom linear movement or a three-degree-of-freedom rotational movement relative to the interferometer lens group (3).

6. The five-degree-of-freedom heterodyne grating interferometry system according to claim 5, wherein displacements of the two-degree-of-freedom linear movements are measured based on the Doppler frequency shift principle, with accuracy being of an order of nanometer; and rotational angles are measured based on the principle of differential wavefront, with a measurement range of the rotational angles being 1 mrad and the accuracy reaching the order of microradian.

7. The five-degree-of-freedom heterodyne grating interferometry system according to claim 5, when solving displacement two-degree-of-freedom linear movement, a first temperature drift error of the horizontal displacement is automatically eliminated, and a second temperature drift error of vertical displacement is eliminated by the compensation interference signal.

8. The five-degree-of-freedom heterodyne grating interferometry system according to claim 1, wherein number of the compensation interference signal is one, number of the measurement interference signal is two, and the two measurement interference signals and the one compensation interference signal are respectively received by the optical fiber bundles (5).

9. The five-degree-of-freedom heterodyne grating interferometry system according to claim 8, wherein each optical fiber bundle (5) has four optical fibers that are located at different positions in a same plane and are used to receive interference signals of four quadrants; each optical fiber bundle (5) outputs four optical signals.

10. The five-degree-of-freedom heterodyne grating interferometry system according to claim 1, wherein the five-degree-of-freedom heterodyne grating interferometry system further comprises a photoelectric conversion unit (6) and an electronic signal processing component (7), the photoelectric conversion unit (6) is used to receive the optical signals transmitted by the optical fiber bundles (5) and convert them into electrical signals for input into the electronic signal processing component (7); and the electronic signal processing component (7) receives the electrical signals to solve linear displacement or rotational movement of the measurement grating (4).

11. The five-degree-of-freedom heterodyne grating interferometry system according to claim 1, wherein the measurement system is suitable for laser interferometers, grating interferometers, heterodyne interferometers, and homodyne interferometers.

12. The five-degree-of-freedom heterodyne grating interferometry system according to claim 1, wherein the compensation interference signal can compensate for optical fiber transmission errors of the measurement system.

* * * * *